United States Patent
Enssle et al.

(10) Patent No.: US 6,798,790 B1
(45) Date of Patent: Sep. 28, 2004

(54) METHOD OF GENERATING A CLOCK SIGNAL FOR THE UPSTREAM CHANNEL OF A BIDIRECTIONAL POINT-TO-MULTIPOINT NETWORK

(75) Inventors: Jürgen Enssle, Fellbach (DE); Hardy Halbauer, Ettlingen (DE); Jürgen Otterbach, Stuttgart (DE)

(73) Assignee: Alcatel, Paris (FR)

( * ) Notice: Subject to any disclaimer, the term of this patent is extended or adjusted under 35 U.S.C. 154(b) by 854 days.

(21) Appl. No.: 09/588,174

(22) Filed: Jun. 7, 2000

(30) Foreign Application Priority Data

Jun. 26, 1999 (DE) .......................................... 199 29 337

(51) Int. Cl.[7] ................................................. H04L 7/00
(52) U.S. Cl. ...................................... 370/503; 370/516
(58) Field of Search ................................ 370/503, 507, 370/516, 320, 342, 441

(56) References Cited

U.S. PATENT DOCUMENTS 5,416,808 A * 5/1995 Witsaman et al. .......... 375/350

6,380,774 B2 * 4/2002 Saeki .......................... 327/119

* cited by examiner

Primary Examiner—Kenneth Vanderpuye
(74) Attorney, Agent, or Firm—Sughrue Mion, PLLC

(57) ABSTRACT

A master clock signal generated at the center (1) of a bidirectional point-to-multipoint network is transmitted in the form of time stamps in an MPEG-2 data format over the downstream channel of the network to a plurality of transmitting/receiving facilities (3). Each transmitting/receiving facility (3) derives the clock signal for the upstream channel from the master clock signal and a local clock signal generated by a reference clock (12). The center (1) compares the clock signal from each transmitting/receiving facility with the master clock signal and derives from the result of this comparison digital phase correction information individual to each transmitting/receiving facility (3), which it transmits to the respective transmitting/receiving facility (3) in the MPEG-2 data stream. The respective transmitting/receiving facility (3) uses the phase correction information to control the clock signal for the upstream channel in a numerically controlled oscillator (13).

11 Claims, 1 Drawing Sheet

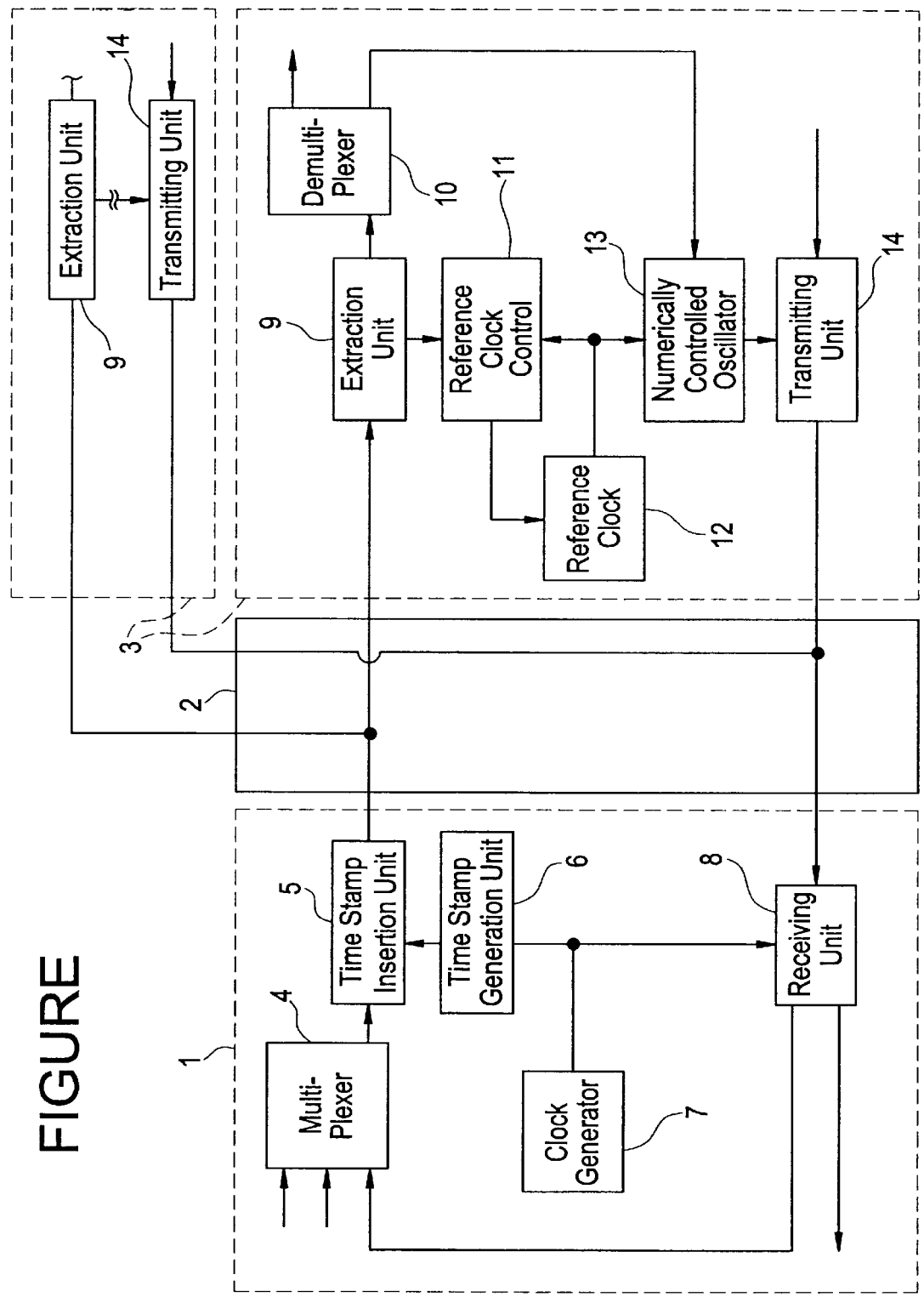

METHOD OF GENERATING A CLOCK SIGNAL FOR THE UPSTREAM CHANNEL OF A BIDIRECTIONAL POINT-TO-MULTIPOINT NETWORK

BACKGROUND OF THE INVENTION

This invention relates to a module for generating a clock signal for the upstream channel of a bidrectional point-to-multipoint network, to a center of the network, and to a method of generating the clock signal for the upstream channel of the bidirectional point-to-multipoint network.

As point-to-multipoint networks in the area of wireline networks, hybrid fiber/coax networks, for example, are known. In the area of wireless networks, radio networks, for example, particularly cellular radio networks or cellular mobile radio networks, are known. In the area of mixed structure networks, hybrid fiber/radio networks, for example, are known.

In point-to-multipoint networks, information is transmitted from a center over a downstream channel to a plurality of transmitting/receiving facilities. Such transmitting/receiving facilities are, for example, decoders, set-top boxes, mobile telephones. The information contains, for example, television signals, video signals, Internet signals, telephone signals. Over an upstream channel, information is transmitted from the transmitting/receiving facilities to the center. The information transmitted in the upstream channel contains, for example, request signals for videos, Internet access signals, telephone signals.

Access by the transmitting/receiving facilities to the upstream channel must be controlled. Several access techniques are known, including time division multiple access (TDMA), frequency division multiple access (FDMA), code division multiple access (CDMA). A special version of CDMA is synchronous CDMA (S-CDMA).

In CDMA, each transmitting/receiving facility is assigned an individual code. The transmission of the data of all transmitting/receiving facilities takes place in the same frequency range using spread spectrum modulation. In S-CDMA, the transmission of the codes must additionally be coordinated in such a way that the codes arriving at the center are synchronous.

SUMMARY OF THE INVENTION

The invention provides a module for generating a clock signal for the upstream channel of a bidirectional point-to-multipoint network comprising a center and a plurality of transmitting/receiving facilities, with the upstream channel being accessed using S-CDMA in particular, wherein a reference clock is provided for generating a reference clock signal, wherein the reference clock is connected to a reference clock control and a numerically controlled oscillator, the reference clock control being adapted to compare the reference clock signal with digital master clock frequency information received over the network, and to derive from the result of the comparison a control signal for adjusting the reference clock signal to the master clock signal, and wherein the numerically controlled oscillator is adapted to generate the clock signal for the upstream channel from the reference clock signal and individual, digital phase correction information.

The invention further resides in a center of such a network, the center comprising a transmitting unit for transmitting information over the network, a clock generator for generating a master clock signal, and a receiving unit, controlled by the master clock signal, for receiving information, wherein the receiving unit is adapted to derive from the received information digital phase correction information for individual transmitting/receiving facilities and to feed said phase correction information to the transmitting unit, the transmitting unit being adapted to transmit the master clock signal in the form of digitally encoded frequency information and the individual phase correction information together with data over the network.

Finally, the invention resides in a method of generating such a clock signal wherein a master clock signal generated at the center is transmitted in the form of digitally encoded frequency information over the network to the transmitting/receiving facilities, the transmitting/receiving facilities deriving the clock signal for the upstream channel from the digitally transmitted frequency information and a local clock signal, the center comparing the phase of the clock signal received from each transmitting/receiving facility with the phase of the master clock signal and deriving from the result of this comparison digital phase correction information individual to each transmitting/receiving facility, which it transmits to the respective transmitting/receiving facility (3), and the respective transmitting/receiving facility (3) adjusting the clock phase for the upstream signal using the individual phase correction information.

Further advantageous features of the invention are defined in the dependent claims.

BRIEF DESCRIPTION OF THE DRAWINGS

The invention will become more apparent by reference to the following description of an embodiment of the invention taken in conjunction with the accompanying drawing wherein the single FIGURE illustrates a network embodying the invention.

DETAILED DECRIPTION OF THE INVENTION

The single FIGURE of the drawing shows a point-to-multipoint network containing a center 1 which is connected by a network to a plurality of transmitting/receiving facilities, of which only two, 3, are shown in order to simplify the illustration.

To connect center 1 to transmitting/receiving facilities 3, a network 2 with a downstream channel and an upstream channel is provided. Access to the upstream channel is preferably controlled using S-CDMA. Network 2 is, for instance, a passive optical network consisting of fiber optic cables and optical splitters, or a radio network, or a hybrid fiber/coax or hybrid fiber/radio network.

First, a method of generating a clock signal for the upstream channel of the bidirectional point-to-multipoint network will be described. Such a clock signal is also referred to as a "symbol clock" or "chip clock". The frequency of a master clock signal generated at center 1 is digitally encoded. The digital information is transmitted over network 2 to transmitting/receiving facilities 3. Each transmitting/receiving facility 3 derives the clock frequency for the upstream channel from the digitally encoded frequency information of the master clock signal and a local clock signal. Center 1 compares the clock signal from each transmitting/receiving facility 3 with the master clock signal and derives from the result of this comparison digital phase correction information individual to each transmitting/receiving facility 3, which it transmits to the respective transmitting/receiving facility 3. Using the individual phase correction information, the respective transmitting/receiving facility 3 controls the clock phase for the upstream channel.

To accomplish this, center 1 of the bidirectional point-to-multipoint network contains a transmitting unit 4, 5, 6 for transmitting information over network 2, a clock generator 7 for generating the master clock signal, and a receiving unit 8 for receiving information, which is controlled by the master clock signal. The receiving unit 8 is suited to deriving digital phase correction information individual to transmitting/receiving facilities 3 from the received information, for example by comparing the phases of the received clock signal and the master clock signal, and to feeding this information to transmitting unit 4, 5, 6. Transmitting unit 4, 5, 6 is suited to transmitting the digitally encoded frequency information of the master clock signal and the individual phase correction information together with data over network 2.

Transmitting unit 4, 5, 6 contains a multiplexer 4 for multiplexing the data to be transmitted and the individual phase correction information, and a time stamp insertion unit 5 coupled to the output of multiplexer 4 for inserting time stamps (frequency information) generated from the master clock signal by a time stamp generation unit 6 into the multiplexed data stream. Time stamp generation unit 6 contains, for example, a counter that continuously counts the cycles of the clock frequency. Multiplexer 4 generates, at given intervals, data fields with a specific identification. Time stamp insertion unit 5 detects the beginning of such a field via a comparator or receives a control signal from multiplexer 4, and overwrites the field with the count then applied. The transmission of the data to be transmitted, the individual phase correction information, and the master clock frequency is digital, preferably using the MPEG-2 format (MPEG=Motion Picture Expert Group). MPEG-2 formats are used in DVB and DAVIC networks, for example (DVB=digital video broadcasting, DAVIC=Digital Audio Visual Council).

Multiplexer 4 is designed as an MPEG-2 multiplexer, for example. Multiplexer 4 then can insert so-called packets into the data stream. The packets serve to transmit control messages. As control messages, time stamps may be inserted. The delay of the insertion of the control messages, however, is not foreseeable. For individual signals, such as the phase correction information, this is not impeding. If periodic signals, such as clock signals, are inserted, however, jitter may occur. To reduce the jitter, the master clock signal is inserted into the data stream only in time stamp insertion unit 5, which follows multiplexer 4. Time stamp insertion unit 5 monitors the data stream for fields that are intended for the transmission of control messages. Predetermined fields are then overwritten with the current time stamps, which contain the master clock signal. Before that, the master clock signal is adapted to the format of the time stamps in time stamp generation unit 6.

In addition to the phase correction information, individual, digital frequency correction information may be generated and transmitted. To this end, the frequencies of the received clock signal and the master clock signal, for example, are compared in receiving unit 8. The individual frequency correction information is also fed to multiplexer 4.

Transmitting/receiving facility 3 includes a module for generating a clock signal for the upstream channel of the bidirectional point-to-multipoint network. The module contains a reference clock 12 for generating a reference clock signal. Reference clock 12 is connected to a reference clock control 11 and a numerically controlled oscillator 13. Reference clock control 11 is suited to comparing the reference clock frequency with the master clock frequency information received over the network, and to deriving from the result of the comparison a control signal or locking the reference clock frequency to the master clock frequency generated at center 1. The numerically controlled oscillator 13 is suited to generating the clock signal for the upstream channel from the reference clock signal and the individual, digital phase correction information and, if present, the individual frequency correction information. The use of a numerically controlled oscillator 13 is particularly advantageous in that the adjustment/programming of both the output frequency and the phase is possible in a simple manner. The adjustability of the output frequency to a value unequal to that of the master clock frequency has the advantage that for individual transmitting/receiving facilities 3, a clock rate adapted to, e.g., the individual data rate can be used. This permits flexible, but always synchronous clock generation. Numerically controlled oscillator 13 may be preceded by a synthesizer, for instance in order to increase or decrease the reference clock frequency of reference clock 12 by a given factor, e.g., by a factor of ten, so that numerically controlled oscillator 13 will be supplied with an optimum clock frequency.

Transmitting/receiving facility 3 further includes a transmitting unit 14 for transmitting information, particularly data, over the upstream channel of the network, and a receiving unit 9, 10 for receiving information. Transmitting unit 14 is controlled by the clock signal for the upstream channel. Receiving unit 9, 10 is suited to extracting the frequency information of the master clock signal and the individual phase correction information from the received information, and to feeding the frequency information to reference clock control 11 and the phase correction information to numerically controlled oscillator 13. Receiving unit 9, 10 contains a demultiplexer 10 for selecting/demultiplexing data and individual phase correction information, and an extraction unit 9 connected ahead of demultiplexer 10 for extracting the frequency information of the master clock signal. Extraction unit 9 detects and extracts the time stamps, which are placed at predetermined locations in the received data stream and contain the frequency information of the master clock signal. A comparator searches the data stream for the identification of the data field. The subsequent data are passed on to reference clock control 11. On the arrival of each new data packet, reference clock control 11 compares the new data packet with the local clock rate and forms the difference. This value is a measure of the deviation of the local clock rate from the master clock rate. From this value, e.g. a control voltage for a voltage-controlled can be derived, or a data word for a further numerically controlled oscillator, which then requires a free-running master clock frequency of sufficient stability.

The invention is implemented using programmable logic devices, for example.

What is claimed is:

1. A module for generating a clock signal for the upstream channel of a bidirectional point-to-multipoint network comprising a center (1) and a plurality of transmitting/receiving facilities (3), with the upstream channel being accessed using S-CDMA in particular, characterized in that said module comprises a reference clock (12) generating a reference clock signal, wherein said reference clock (12) is connected to a reference clock control (11) and a numerically controlled oscillator (13), wherein the reference clock control (11) is adapted to compare the reference clock signal with digital master clock frequency information received over the network, and to derive from the result of the comparison a control signal for adjusting the reference clock signal to the master clock signal, and wherein the numerically controlled oscillator (13) generates the clock signal for the upstream channel from the reference clock signal and individual, digital phase correction information.

2. A transmitting/receiving facility (3) of a bidirectional point-to-multipoint network, characterized in that it comprises a transmitting unit (14) for transmitting information over the upstream channel of the network, a receiving unit (9, 10) for receiving information, and a module comprising a reference clock (12) generating a reference clock signal, wherein said reference clock (12) is connected to a reference clock control (11) and a numerically controlled oscillator (13), the reference clock control (11) being adapted to compare the reference clock signal with digital master clock frequency information received over the network, and to derive from the result of the comparison a control signal for adjusting the reference clock signal to the master clock signal, and wherein the numerically controlled oscillator (13) generates the clock signal for the upstream channel from the reference clock signal and individual, digital phase correction information, said facility being further characterized in that the receiving unit (9, 10) is adapted to extract the frequency information of the master clock signal and the individual phase correction information from the received information and to feed said frequency information to the reference clock control (11) and said phase correction information to the numerically controlled oscillator (13).

3. A center (1) of a bidirectional point-to-multipoint network comprising the center (1) and a plurality of transmitting/receiving facilities (3), characterized in that the center (1) comprises a transmitting unit (4, 5, 6) for transmitting information over the network, a clock generator (7) for generating a master clock signal, and a receiving unit (8), controlled by the master clock signal, for receiving information, that the receiving unit (8) is adapted to derive from the received information digital phase correction information for individual transmitting/receiving facilities (3) and to feed said phase correction information to the transmitting unit (4, 5, 6), and that the transmitting unit (4, 5, 6) is adapted to transmit the master clock signal in the form of digitally encoded frequency information and the individual phase correction information together with data over the network.

4. A method of generating a clock signal for the upstream channel of a bidirectional point-to-multipoint network comprising a center (1) and a plurality of transmitting/receiving facilities (3), said method comprising the steps of transmitting a master clock signal, generated at the center (1), in the form of digitally encoded frequency information over the network to the transmitting/receiving facilities (3), deriving at the transmitting/receiving facilities (3) the clock signal for the upstream channel from the digitally transmitted frequency information and a local clock signal, comparing at the center (1) the phase of the clock signal received from each transmitting/receiving facility (3) with the phase of the master clock signal and deriving from the result of this comparison digital phase correction information individual to each transmitting/receiving facility (3), which it transmits to the respective transmitting/receiving facility (3), and adjusting at the respective transmitting/receiving facility (3) the clock phase for the upstream signal using the individual phase correction information.

5. A transmitting/receiving facility (3) as claimed in claim 2, characterized in that the receiving unit (9, 10) comprises a demultiplexer (10) for selecting data and individual phase correction information, and an extraction unit (9) connected ahead of the demultiplexer (10) for extracting the digital frequency information of the master clock signal.

6. A center (1) as claimed in claim 3, characterized in that the transmitting unit (4, 5, 6) comprises a multiplexer (4) for multiplexing the data to be transmitted and the individual phase correction information, and a time stamp insertion unit (5) following the multiplexer for inserting digital frequency information (time stamps) derived from the master clock signal by a time stamp generation unit (6) into the multiplexed data stream.

7. A center (1) as claimed in claim 3, characterized in that the information is transmitted in the MPEG-2 format.

8. A module as claimed in claim 1, characterized in that the network is designed as a hybrid fiber/coax network or a hybrid fiber/radio network.

9. A center (1) as claimed in claim 3 or a method as claimed in claim 4, characterized in that in addition to the phase correction information, individual, digital frequency correction information is generated and transmitted.

10. A center (1) as claimed in claim 3, characterized in that the network is designed as a hybrid fiber/coax network or a hybrid fiber/radio network.

11. A method as claimed in claim 4, characterized in that in addition to the phase correction information, individual, digital frequency correction information is generated and transmitted.

* * * * *